US012794359B2

(12) United States Patent
Benn et al.

(10) Patent No.: US 12,794,359 B2
(45) Date of Patent: Nov. 10, 2026

(54) LLC VOLTAGE CONVERTER

(71) Applicant: Hamilton Sundstrand Corporation, Charlotte, NC (US)

(72) Inventors: Andrew Benn, Kenilworth (GB); Piyush Waghmare, Solihull (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 147 days.

(21) Appl. No.: 18/970,328

(22) Filed: Dec. 5, 2024

(65) Prior Publication Data

US 2025/0253769 A1 Aug. 7, 2025

(30) Foreign Application Priority Data

Feb. 7, 2024 (EP) .................................... 24275007

(51) Int. Cl.
*H02M 3/00* (2006.01)
*H02M 1/00* (2006.01)
*H02M 3/335* (2006.01)

(52) U.S. Cl.
CPC ......... *H02M 3/015* (2021.05); *H02M 1/0054* (2021.05); *H02M 3/01* (2021.05); *H02M 3/33571* (2021.05); *H02M 3/33576* (2013.01); *H02M 3/33573* (2021.05); *Y02B 70/10* (2013.01)

(58) Field of Classification Search
CPC ............... H02M 3/015; H02M 1/0054; H02M 3/33571; H02M 3/33576; H02M 3/33573; H02M 3/01; H02M 3/33584; Y02B 70/10
See application file for complete search history.

(56) References Cited

U.S. PATENT DOCUMENTS

| | | | |
|---|---|---|---|
| 11,223,287 | B2 | 1/2022 | Hergt et al. |
| 2023/0283172 | A1 | 9/2023 | Gao et al. |

FOREIGN PATENT DOCUMENTS

| | | | | |
|---|---|---|---|---|
| CN | 105915066 | A | | 8/2016 |
| CN | 108122664 | A | | 6/2018 |
| CN | 106130356 | B | | 12/2018 |
| CN | 105553280 | B | | 2/2019 |
| CN | 114301274 | A | | 4/2022 |
| JP | 2020107434 | A | * | 7/2020 |
| WO | 2019170781 | A1 | | 9/2019 |

OTHER PUBLICATIONS

European Search Report in connection with counterpart European Patent Application No. 24275007.3 dated Jul. 10, 2024, 26 pages.

* cited by examiner

*Primary Examiner* — Crystal L Hammond
*Assistant Examiner* — Jonathan Walter Soileau

(57) ABSTRACT

An LLC voltage converter for converting a DC input voltage to a DC output voltage includes a transformer and a controller. The controller is arranged to monitor an operational parameter and operate the LLC voltage converter in a first mode, in which the transformer has a first turns ratio, when a value of the operational parameter is within a first range. In response to determining that the value of the operational parameter has changed to be outside the first range and inside a second range, the controller is arranged to transition the LLC voltage converter from operating in the first mode to operate in a second mode, in which the transformer has a second turns ratio. The first range at least partially overlaps the second range.

20 Claims, 4 Drawing Sheets

| Vin (V) | Fs (kHz) | Turns-ratio | Vo (V) | Pin (W) | Po (W) | η% |
|---|---|---|---|---|---|---|
| 470 | 73 | 10 | 28 | 3056 | 3000 | 98.2 |
| 560 | 100 | 10 | 28 | 3041 | 3000 | 98.7 |
| 650 | 157 | 10 | 28 | 3129 | 3000 | 95.9 |

FIG. 7

| Vin (V) | Fs (kHz) | Turns-ratio | Vo (V) | Pin (W) | Po (W) | η% |
|---|---|---|---|---|---|---|
| 470 | 86 | 9 | 28 | 3050 | 3000 | 98.4 |
| 560 | 100 | 10 | 28 | 3041 | 3000 | 98.7 |
| 650 | 114 | 11 | 28 | 3072 | 3000 | 97.7 |

FIG. 8

LLC VOLTAGE CONVERTER

CROSS-REFERENCE TO RELATED APPLICATION AND PRIORITY CLAIM

This application claims priority under 35 U.S.C. § 119 to European Patent Application No. 24275007.3 filed on Feb. 7, 2024, which is hereby incorporated by reference in its entirety.

TECHNICAL FIELD

This disclosure relates to LLC voltage converters for DC to DC voltage conversion. In particular, the disclosure relates to LLC voltage converters having a transformer with a configurable turns ratio.

BACKGROUND

For applications that require DC to DC voltage conversion, it may be desirable to have galvanic isolation between the input voltage and the output voltage. For example, in applications that involve stepping-down a high input voltage to a low output voltage, galvanic isolation may improve safety by reducing the risk of exposure to the high input voltage at the output. By way of example, in aerospace applications that use a high voltage for systems such as the aircraft's propulsion systems and a low voltage for systems such as power outlets for passengers, galvanic isolation may prevent passengers from being exposed to high voltages. In aerospace applications, high voltages may include, for example, voltages in the range of 100V to 3 kV, whereas low voltages may include voltages of approximately 28V.

A DC to DC voltage converter topology that provides galvanic isolation between the input voltage and the output voltage is that of an LLC voltage converter. This topology includes a transformer, with an input winding and an output winding, arranged between the input side and the output side of the LLC converter.

LLC voltage converters also include an inverter, a resonant tank and a rectifier. The inverter converts the DC input voltage into an alternating, AC, voltage which is received by the resonant tank. The resonant tank filters the alternating voltage from the inverter. The input winding of the transformer is connected to the resonant tank to receive the (filtered) alternating voltage and induce a secondary alternating voltage across the output winding. The rectifier rectifies the secondary voltage, and may filter out AC components, to provide a DC output voltage across a load.

The impedance of the resonant tank varies depending on the frequency of the voltage applied to it. At the resonant frequency of the resonant tank, the impedance is substantially zero and thus resonant tank losses are minimised. However, the greater the difference between the resonant frequency and the frequency of the voltage applied to it (e.g. a switching frequency of the alternating voltage from the inverter), the greater the associated losses.

Typically, LLC voltage converters are operated using a feedback loop to adjust a (switching) frequency of the alternating voltage so as to achieve a desired output voltage. By way of example, increasing the switching frequency may result in a decrease of the output voltage and vice-versa. Thus, LLC voltage converters are often used when the input voltage, the output voltage and/or the output load are not expected to vary significantly. This may ensure that the switching frequency does not need to be varied significantly in use, and thus may remain proximate to the resonant frequency.

However, if any of the input voltage, the (desired) output voltage or the output load vary significantly, large variations of the switching frequency may be necessary. The switching frequency being significantly lower or higher than the resonant frequency may result in relatively high losses in the resonant tank.

Inefficiency in the voltage conversion process may result in power dissipation through heat loss. Such heat losses may require more cooling to cool the LLC voltage converter, which may result in associated increases in size, cost and/or weight. Heat losses may result in components, such as switching elements in the inverter, operating at a higher temperature. Components operating at high temperatures may be less reliable than components operated at lower temperatures. Thus, efficiency improvement may result in reliability improvements of the LLC voltage converter. Alternatively, or in addition, more expensive and/or larger components may be required to operate at higher temperatures. For example, inefficiency in the voltage conversion process may lead to thermal challenges, necessitating the use of a larger, more expensive and/or heavier heatsink (or the like) to cool the LLC voltage converter when transferring the same amount of power as a more efficient equivalent LLC voltage converter.

Inefficiency may result from losses in, e.g., the resonant tank or the transformer core as a result of an increase to the RMS current on both the primary and secondary sides of the transformer. This increase in the RMS current may be related to the difference between the switching frequency and the resonant frequency.

Inefficiency in the voltage conversion process may result in increased power requirements. Hence, for example, in battery-powered applications, a larger, more expensive and/or heavier battery may need to be used in order to supply power to the converter. In applications which consume fuel, more fuel (and potentially a larger fuel tank) may be required to compensate for any inefficiency in the voltage conversion process.

An improved approach may be desired.

SUMMARY

The present disclosure provides an LLC voltage converter for converting a DC input voltage to a DC output voltage, comprising: an inverter arranged to receive the DC input voltage and provide an alternating voltage that alternates at a switching frequency; a resonant tank having a resonant frequency and arranged to filter the alternating voltage from the inverter; a transformer arranged to receive the alternating voltage from the resonant tank and induce a secondary alternating voltage; a rectifier arranged to receive and rectify the secondary alternating voltage to provide the DC output voltage; and a controller arranged to: monitor an operational parameter of the LLC voltage converter; operate the LLC voltage converter in a first mode, in which the transformer has a first turns ratio, when a value of the operational parameter is within a first range; determine that the value of the operational parameter has changed to be outside the first range and inside a second range, wherein the first range and the second range at least partially overlap; and in response to determining that the value of the operational parameter has changed to be outside the first range and inside the second range, transition the LLC voltage converter from operating in the first mode to operate in a second mode, in which the transformer has a second turns ratio.

Thus, it will be recognized by those skilled in the art that, by changing the turns ratio of the transformer in response to changes in the value of the operational parameter, an LLC voltage converter according to examples of the present disclosure may be operated with a switching frequency that is generally closer to the resonant frequency, improving efficiency. Moreover, because the first and second ranges overlap, transitions between the first and second modes may be made more smoothly, e.g. avoiding unnecessary transitions that might occur if the operational parameter was noisy and near to a single threshold value. The LLC voltage converter does not simply transition to the second mode when the value of the operational parameter enters the second range, but waits until the value of the operational parameter leaves the first range (i.e. leaves the overlap between the ranges) before transitioning.

The LLC voltage converter does not transition between modes simply based on the current value of the operational parameter, but based on the past behaviour of the operational parameter too. This provides hysteresis, which may mitigate unnecessary transitions and improve overall efficiency. As explained below in more detail, the LLC voltage converter may be arranged to transition back to the first mode if the value of the operational parameter changes to be outside the second range and inside a first range again, and it will be appreciated that in such examples it may be possible for the LLC voltage converter to be operating in either mode when the value of the operational parameter is the overlapping region of the first and second ranges, depending on which range it has come from.

The operational parameter may comprise the DC input voltage. The operational parameter may comprise a parameter indicative of the DC input voltage, such as the switching frequency of the alternating voltage. The operational parameter may comprise the impedance of an output load. The operational parameter may comprise a parameter indicative of the impedance of an output load, such as the switching frequency of the alternating voltage or the, e.g. measured, DC output voltage. The operational parameter may be a combination of multiple parameters (e.g. a function of the DC input voltage and the impedance of the output load).

The controller may monitor the operational parameter of the LLC voltage converter continuously (e.g. by taking samples at a very high rate such as every 1 ms or quicker, or by monitoring the operational parameter with asynchronous analogue logic as explained in more detail below). However, continuous monitoring may be relatively power intensive and/or may lead to excessive mode transitioning (e.g. if the operational parameter is noisy). Therefore, in some examples, the controller is arranged to monitor the operational parameter at regular or irregular intervals (e.g. every 100 ms or more). This may reduce power use and/or avoid unnecessarily frequency changes in mode.

In some examples, the controller is arranged to only transition the LLC voltage converter from the first mode to the second mode in response to determining that the operational parameter has changed to be outside the first range and inside the second range for a minimum duration. The minimum duration may be, for instance, 1 ms, 10 ms, 100 ms, 500 ms, etc. The minimum duration may be determined at least in part by inherent component response times in monitoring circuitry. This approach may mitigate the LLC converter transitioning from the first mode of operation to the second mode of operation unnecessarily frequently, e.g. in response to only a transient variation of the operational parameter (e.g., the input voltage).

In some examples, the controller is arranged to only transition the LLC voltage converter from the first mode to the second mode in response to determining that the operational parameter has changed to be outside the first range and inside the second range for a minimum number of successive samples (e.g. two or more).

The controller may comprise digital monitoring and/or control circuitry, e.g., an analogue-to-digital converter used to sample the operational parameter at regular or irregular intervals and further digital logic (e.g. a processor) arranged to trigger a transition between modes when the sampling indicates that this is appropriate. Doing the monitoring with digital logic may be relatively power efficient and/or facilitate greater customisation over how the monitoring and transitioning is done (e.g. allowing for the tailoring of sampling intervals and/or ranges to implementation-specific requirements).

Additionally or alternatively, the controller may comprise analogue monitoring and/or control circuitry, e.g. one or more analogue comparators arranged to receive the operational parameter and trigger a transition when the operational parameter exceeds or drops below a threshold. The use of analogue logic to do the monitoring may simplify the controller and/or allow for faster operation. In a set of examples, the controller comprises a Schmitt trigger configured to determine whether a transition from the first mode to the second mode should take place, e.g. with a lower switching threshold corresponding to a lower boundary of the second range and an upper switching threshold corresponding to an upper boundary of the first range.

In some examples, the LLC voltage converter is arranged to adjust the switching frequency to drive DC output voltage towards a target DC output voltage. The desired DC output may be constant or it may vary as the LLC voltage converter is used.

The LLC voltage converter may be arranged to monitor the DC output voltage (e.g. measure a value thereof) and control the switching frequency to drive the DC output voltage towards a target DC output voltage. In other words, the LLC voltage converter may control the switching frequency based on feedback of the DC output voltage. Alternatively, the LLC voltage converter may control the switching frequency based on other considerations such as the DC input voltage (e.g. to maintain a target input voltage).

As previously explained, it may be desirable to minimise the difference between the switching frequency and the resonant frequency in use, e.g. to minimise associated losses. In some sets of examples, the LLC voltage converter is arranged such that, in use, the switching frequency remains close to the resonant frequency. For instance, the LLC voltage converter may be arranged such that, in use, the switching frequency remains within 20% or less, 15% or less, 10% or less, or 5% or less of the resonant frequency. This may be achieved, for example, by selecting appropriate control parameters (e.g. the first range, second range, the first turns ratio and/or the second turns ratio) based on expected operational variations (e.g. expected variations in DC input voltage, DC output voltage and/or output loads).

In some examples, the first range, the second range, the first turns ratio and the second turns ratio are such that transitioning from the first mode to the second mode causes the switching frequency to become closer to the resonant frequency. By way of example, the LLC voltage converter may be configured such that, when the operational parameter is within the second range and outside the first range, the necessary switching frequency to achieve a target DC output voltage when the transformer has the second turns ratio is closer to the resonant frequency than the necessary switching frequency to achieve the same DC output voltage when the transformer has the first turns ratio.

By way of example, the operational parameter may be the switching frequency. During use, this may increase to compensate for changes in an input voltage such that it moves outside of the first range and inside of the second range. In response the controller may transition the converter to the second mode to reduce a number of turns of the input winding whilst the output winding stays the same. This change in turns ratio means that a lower switching frequency is necessary to achieve a certain DC output voltage, and so the switching frequency will move back towards the resonant frequency. Operation of the LLC voltage converter with the switching frequency closer to the resonant frequency may ensure that the gain of this part of the converter remains closer to 1, which may result in improved efficiency.

The LLC voltage converter may have any appropriate DC to DC LLC voltage converter topology. For instance, various topologies of inverters may be used including, for example, a half-bridge topology, a full-bridge topology or the like.

The alternating voltage may alternate between a high value and a low value. The low value may be negative, e.g. when a full-bridge inverter is used. Alternatively, the low value may be at or near zero. e.g. when a half-bridge inverter is used. The high value, the low value and/or the switching frequency may vary in use.

Various topologies of rectifiers may be used, including, for example, a push-pull topology with a center-tapped output transformer winding, a full-bridge rectifier topology or the like.

The rectifier may be arranged to filter out AC components of the secondary alternating voltage. By way of example, the rectifier may comprise a smoothing capacitor configured in parallel with the DC output voltage, and arranged to filter out AC components of the secondary alternating voltage.

The resonant tank may be arranged with the resonant capacitance (e.g. a capacitor, parasitic capacitance or the like) in series with the resonant inductance (e.g. an inductor, parasitic inductance or the like). In some examples, the resonant tank comprises a distinct magnetizing inductance in parallel with the resonant capacitance. However, this inductance may alternatively be provided by an input winding of the transformer. For instance, the input winding of the transformer may be modelled as a leakage inductance in series with a magnetizing inductance.

The LLC voltage converter may be arranged to step-up the DC input voltage into a higher DC output voltage in at least one mode (e.g. in the first mode, in the second mode, or in both (or every) mode). The LLC voltage converter may be arranged to step-down the DC input voltage into a lower DC output voltage in at least one mode (e.g. in the first mode, in the second mode, or in both (or every) mode). A step-up LLC voltage converter typically features a step-up transformer (i.e. with more turns on the input winding than the output winding) and a step-down LLC voltage converter typically features a step-down transformer (i.e. with fewer turns on the input winding than the output winding). In certain examples, the LLC voltage converter is arranged to step-up the DC input voltage in every mode or to step-down the DC input voltage in every mode, although this isn't essential as, for example, the converter could change from being step-up to step-down when the mode changes.

The turns ratio of the transformer may be varied by simply engaging entirely different input windings and/or output windings with different numbers of turns. For instance, a first input winding may be used in the first mode and a separate second input winding, with a different number of turns, may be used in the second mode (e.g. with the same output winding for both modes). However, using entirely separate windings may unnecessarily increase the size, cost, mass and/or complexity of the voltage converter. Therefore, in a set of examples, different sections of an input winding and/or different sections of an output winding are used to obtain different turns ratios.

Changing the turns ratio of the transformer may involve changing a number of turns in the input winding of the transformer (e.g. by using different sections of an input winding or by changing the entire input winding). In some examples, the controller is arranged to change the number of turns of the input winding of the transformer when transitioning the LLC voltage converter from operating in the first mode to operate in the second mode. For instance, the LLC voltage converter may be configured such that the alternating voltage is provided to a first number of turns of the input winding, when in the first mode of operation; and provided to second number of turns of the input winding, when in the second mode of operation. The first number of turns and the second number of turns of the input winding may comprise at least some of the same turns (i.e. the same physical parts of the transformer). In other words, the first number of turns may partially overlap with the second number of turns, the second number of turns may be a portion of the first number of turns or vice-versa. However this is not essential and in some examples, the first number of turns and the second number of turns do not overlap, i.e. the first number of turns may be separate turns of the input winding than the second number of turns.

Additionally or alternatively, in some examples, changing the turns ratio of the transformer may involve changing a number of turns of the output winding of the transformer (e.g. by using different sections of an output winding or by changing the entire output winding). In some examples, the LLC voltage converter is configured such that the secondary alternating voltage is provided by a first number of turns of the output winding, when in the first mode of operation; and provided by a second number of turns of the output winding, when in the second mode of operation. The first number of turns and the second number of turns of the output winding may comprise at least some of the same turns (i.e. the same physical parts of the transformer). In other words, the first number of turns may partially overlap with the second number of turns, the second number of turns may be a portion of the first number of turns or vice-versa. However this is not essential and in some examples, the first number of turns and the second number of turns do not overlap, i.e. the first number of turns may be separate turns of the input winding than the second number of turns.

In some examples, changing the turns ratio of the transformer (e.g. from the first turns ratio to the second turns ratio or vice-versa) involves changing only the number of turns of the input winding, i.e. whilst keeping the output winding unchanged. In some examples, the controller is arranged to maintain the number of turns of an output winding of the transformer when transitioning the LLC voltage converter from operating in the first mode to operate in the second mode. When the transformer is used to step-down the voltage, the current through the input winding may be lower than the current through the output winding and so switching losses may be reduced by switching the input winding rather than the output winding. This may allow for smaller and/or cheaper switching components to be used. Also, when the transformer is a step down transformer, the number of turns of the input winding (that are used) is greater than the number of turns of the output winding (that are used), leading to more options for turns ratios when switching is done on the input winding.

Conversely, in a set of examples changing the turns ratio of the transformer (e.g. from the first turns ratio to the second turns ratio or vice-versa) involves changing only the number of turns of the output winding. This may be useful for step-up applications in which an input current is larger than an output current.

In some examples, the inverter is able to be selectively connected (via the resonant tank) to a first number of turns of the input winding or a second number of turns of the input winding; and the rectifier is able to be selectively connected to a first number of turns of the output winding or a second number of turns of the output winding. Having a configurable number of turns of both the input winding and the output winding may provide a high degree of configurability of the turns ratio of the transformer, which may enable, e.g., a wide operating range of the LLC voltage converter. If the transformer is configured such that it could operate as either a step-up or step-down transformer, it may be useful to be able to selectively vary either the number of turns of the input winding or the number of turns of the output winding depending on whether the transformer is configured as a step-up or step-down transformer to minimise losses associated with transitioning between modes of operation. In other words, the transformer may be operable to change either one, or both, of the number of turns of an/the input winding or the number of turns of an/the output winding. The LLC voltage converter may be arranged such that the turns ratio of the transformer can be changed by: changing only the number of turns of the input winding whilst keeping the output winding the same; changing only the number of turns of the output winding whilst keeping the input winding; and changing the number of turns of both windings. The LLC voltage converter having multiple different ways to change the turns ratio may aid flexibility.

In some examples, the input and/or the output winding comprises a tap. A tap may enable two (or more) different numbers of turns to be selected from a single winding. For instance, the alternating voltage may be provided between two ends of the input winding when in the first mode (to select a first number of turns of the winding) and the alternating voltage may be provided between one end of the input winding and the tap in the second mode (to select a second, lower number of turns). In other examples, the alternating voltage may be provided between one end of the input winding and the tap when in the first mode, and the alternating voltage may be provided between the other end of the input winding and the tap when in the second mode. Thus, it will be appreciated that a single tap on the input winding may allow the alternating voltage to be selectively connected to any one of three possible numbers of turns. Correspondingly, a single tap on the output winding may allow the rectifier to be selectively connected to any one of three possible numbers of turns.

In some examples, the input winding and/or the output winding may comprise two or more taps. Various combinations of connection are possible with, e.g., two taps and two ends of a winding. For example, the alternating voltage or the secondary alternating voltage may respectively be received/provided between both ends of a winding, between both taps, and/or between either end of the winding and each tap. Thus, for example, in a first mode the alternating voltage may be connected to one end of the input winding and a (first) tap, and in the second mode the alternating voltage may instead be connected to the same end of the input winding and a (second) tap. Various additional combinations of connection are possible with more than two taps. Having more taps may enable greater configuration of the number of turns of the input winding, and thus greater configuration of the turns ratio of the transformer.

In some examples, the controller is arranged to form a circuit which causes the transformer to have the second turns ratio before breaking a circuit which causes the transformer to have the first turns ratio when transitioning the LLC voltage converter from operating in the first mode to operate in the second mode. Transitioning the LLC voltage converter from operating in the first mode to operate in the second mode may comprise forming a circuit which causes the transformer to have the second turns ratio before breaking a circuit which causes the transformer to have the first turns ratio. This may be referred to as “make-then-break” operation. This may reduce losses when transitioning between the first mode and the second mode and/or make the transition smoother and avoid large voltage swings at the output.

For example, when the alternating voltage is connected to a first number of turns of the input winding in the first mode and the alternating voltage is connected to a second number of turns of the input winding in the second mode, transitioning from the first mode to the second mode may comprise forming a circuit connecting the alternating voltage to the second number of turns before breaking the circuit connecting the alternating voltage to the first number of turns. For instance, in examples in which the input winding comprises a tap and the alternating voltage is connected to the tap when in the second mode of operation, transitioning the LLC voltage converter from the first mode of operation to the second mode of operation may include forming a circuit using the tap, e.g. instead of an end of the input winding or another tap, before breaking the circuit using, e.g., the end of the input winding or the other tap.

The LLC voltage converter may comprise a switching arrangement arranged to transition the transformer’s turns ratio from the first turns ratio to the second turns ratio (i.e. operable to configure the transformer to have the first turns ratio and the second turns ratio and, in some relevant examples, one or more additional turns ratios). For instance, in examples in which the input winding comprises a tap and the alternating voltage is connected to the tap when in the second mode of operation, the switching arrangement may be arranged to connect the alternating voltage to the tap, e.g. instead of an end of the output winding or another tap.

The switching arrangement may be provided on an input side or an output side of the transformer. For instance, in examples in which the output winding comprises a tap and the rectifier is connected to the tap when in the second mode of operation, the switching arrangement may be arranged to connect the rectifier to the tap, e.g. instead of an end of the output winding or another tap.

The switching arrangement may, for example, comprise a one-to-many switch (i.e. a demultiplexer). The one-to-many switch may be operable to connect the alternating voltage to one of several different input windings (and/or different portions of the same input winding) and/or to connect one of several different output windings (and/or different portions of the same output winding) to the rectifier. However, this type of switch may not be suited to make-then-break operation.

Thus, in some examples, the switching arrangement is operable to selectively connect an input (e.g. the alternating voltage from the resonant tank) to one or more outputs (e.g. different input windings or portions of input windings). Such a switching arrangement may be able to simultaneously connect several outputs to the input to facilitate the make-then-break operation discussed above. in other words, the switching arrangement may be operable to connect its input to two outputs when transitioning between the first mode and the second mode, before breaking its connection to one of the outputs.

In a set of examples, the switching arrangement comprises a plurality of switches that are separately operable to configure the transformer to have different turns ratios. For instance, the switching arrangement may comprise a plurality of switches (e.g. two) which are operable to connect the alternating voltage to a corresponding plurality of input windings (and/or portions of the same input winding). Additionally or alternatively, the switching arrangement may comprise a plurality of switches operable to connect a corresponding plurality of output windings (and/or portions of the same output winding) to the rectifier.

In some examples, there may be a plurality of switching arrangements. For example, an input winding of the transformer may be tapped at both ends, and in such examples a switching arrangement may be used at both ends of the input winding. Alternatively, or in addition, the output winding may be tapped at both ends and thus a switching arrangement may be provided at both ends of the output winding. Equally, the input winding and the output winding may both be tapped at only one end, but each of the input winding and the output winding may have a respective switching arrangement.

In some examples, the inverter may be operable to change a turns ratio of the transformer, e.g. in addition or alternatively to a separate switching arrangement. In some examples, the inverter comprises a first set of power switching elements arranged to provide the alternating voltage (via the resonant tank) to a first input winding (or a first portion of the input winding) of the transformer via the resonant tank and a second set of power switching elements arranged to provide the alternating voltage to a second input winding (or a second portion of the input winding) of the transformer via the resonant tank. In some such examples the inverter is operable to change the turns ratio of the transformer by using the first set of power switching elements when in the first mode and using the second set of power switching elements when in the second mode. The first and second set of power switching elements may overlap (i.e. having one or more power switching elements in common).

Additionally or alternatively, in some examples, the rectifier may be operable to change a turns ratio of the transformer, e.g. in addition or alternatively to a separate switching arrangement. In some examples, the rectifier comprises a first set of rectifying switching elements arranged to receive and rectify the secondary alternating voltage from a first output winding (or a first portion of the output winding) of the transformer and a second set of rectifying switching elements arranged to receive and rectify the secondary alternating voltage from a second output winding (or a second portion of the output winding) of the transformer. The first and second set of rectifying switching elements may overlap (i.e. having one or more power switching elements in common).

The controller may be arranged to control transitions of the LLC voltage converter in the other direction (i.e. from the second mode to the first mode) in a corresponding way, if the operational parameter moves in an opposite direction. In other words, the controller may be arranged to: operate the LLC voltage converter in the second mode when a value of the operational parameter is within the second range; determine that the value of the operational parameter has changed to be outside the second range and inside the first range; and in response to determining that the value of the operational parameter has changed to be outside the second range and inside the first range, transition the LLC voltage converter from operating in the second mode to operate in the first mode.

In some sets of examples, the LLC voltage converter may be operable in additional modes (e.g. a third mode, a fourth mode, etc.) in which the transformer has a further turns ratios (e.g. third, fourth turns ratios, etc.), for instance achieved with multiple taps on input or output windings. The further modes may be employed when the operational parameter moves into corresponding further ranges and out of previous ranges, to provide additional flexibility in compensating for changes in the operational parameter (e.g. compensating for larger variations in the operational parameter and/or increasing the resolution with which the changes made be compensated for). The LLC voltage converter may be arranged to transition into and/or out of said further modes in the same or similar way as the first and second modes described above. In a set of examples, the LLC voltage converter has three modes. This may strike a reasonable balance between flexibility and complexity. For instance, the controller may be arranged to: determine that the value of the operational parameter has changed to be outside the first range and the second range and inside a third range, wherein the third range at least partially overlaps the first range or the second range; and in response to determining that the value of the operational parameter has changed to be outside the first range and the second range and inside the third range, transition the LLC voltage converter to operate in a third mode, in which the transformer has a third turns ratio.

In some examples, the output winding of the transformer is a center-tapped winding and the rectifier has a push-pull rectifier topology. This may be desired topology for any number of reasons. In such examples, it may be easier to tap an input winding than an output winding, e.g. in order to have a transformer which can be configured to have at least a first turns ratio or a second turns ratio.

In some examples, the transformer is a planar transformer. This may facilitate the provision of one or more taps on the planar transformer winding(s), as such transformers may be easily tapped.

The disclosure also provides a method of controlling an LLC voltage converter to convert a DC input voltage to a DC output voltage, the LLC voltage converter comprising: an inverter arranged to receive the DC input voltage and provide an alternating voltage that alternates at a switching frequency; a resonant tank having a resonant frequency arranged to filter the alternating voltage from the inverter; and a transformer, arranged to receive the alternating voltage from the resonant tank and to induce a secondary alternating voltage; wherein the method comprises: monitoring an operational parameter of the LLC voltage converter; operating the LLC voltage converter in a first mode, in which the transformer has a first turns ratio, when a value of the operational parameter is within a first range; determining that the value of the operational parameter has changed to be outside the first range and inside a second range, wherein the first range and the second range at least partially overlap; and in response to determining that the value of the operational parameter has changed to be outside the first range and inside the second range, transitioning the LLC voltage converter from operating in the first mode to operate in a second mode, in which the transformer has a second turns ratio.

Features of any example described herein may, wherever appropriate, be applied to any other example described herein. Where reference is made to different examples, it should be understood that these are not necessarily distinct but may overlap. It will be appreciated that all of the optional features described above with reference to the LLC voltage converter may also be applied where relevant to the method of controlling an LLC voltage converter.

BRIEF DESCRIPTION OF DRAWINGS

One or more non-limiting examples will now be described, by way of example only, and with reference to the accompanying figures in which:

FIGS. 7 and 8 show tables including corresponding experimental data for the graphs shown in FIGS. 5 and 6.

DETAILED DESCRIPTION

Figure 1:
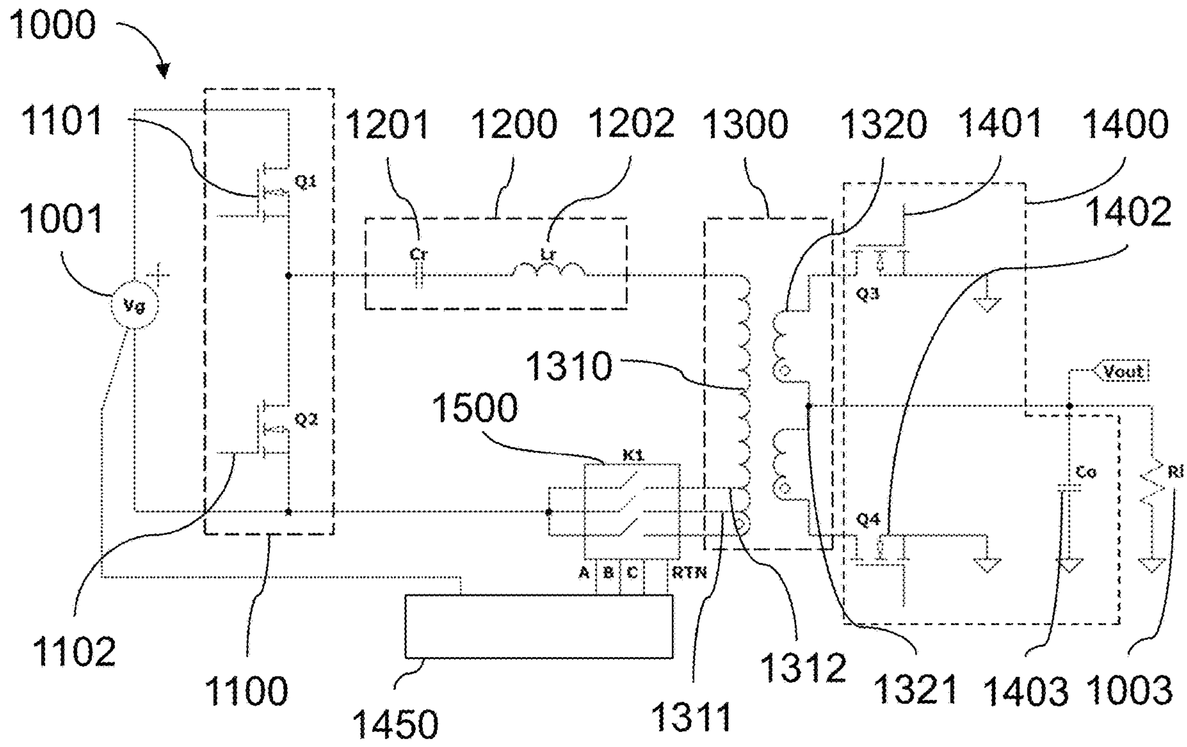
FIG. 1 shows an LLC converter for converting a DC input voltage to a DC output voltage.

FIG. 1 shows an LLC voltage converter 1000 for converting a DC input voltage Vg from an attached voltage source 1001, such as a battery, to a DC output voltage Vout, which is applied across an attached load 1003. The LLC converter 1000 has an inverter 1100, a resonant tank 1200, a transformer 1300, a rectifier 1400 and a controller 1450. The LLC voltage converter in this example also includes a switching arrangement 1500. The controller 1450 monitors the input voltage Vg and controls the switching arrangement 1500 in response, as explained below.

The inverter 1100 receives the DC input voltage Vg and generates an alternating, AC, voltage. In this example, the inverter 1100 is a half-bridge inverter, although other inverter topologies could instead be used such as, for example, a full-bridge inverter.

The inverter 1100 in this example has a first power switching element 1101 and a second power switching element 1102. Either, or both, of the power switching elements 1101 and 1102 may be, for example, a switch, a MOSFET or the like. When the first switching element 1101 is closed and the second switching element 1102 is open, the voltage provided by the inverter 1100 is at Vg. When the first power switching element 1101 is open and the second power switching element 1102 is closed, the voltage provided by the inverter 1100 is zero. Thus, alternating the power switching elements 1101 and 1102 between these switching states produces an alternating, AC, voltage. The frequency of the alternating voltage is controlled by controlling the switching frequency at which the switching elements 1101 and 1102 are operated. The switching frequency of the inverter 1100 may be controlled by the controller 1450 or by separate circuitry (not shown).

The resonant tank 1200 has a resonant capacitance 1201 and a resonant inductance 1202. The resonant tank 1200 receives the (square wave) alternating voltage from the inverter 1100 and filters it to produce a sinusoidal alternating voltage.

An input winding 1310 of the transformer 1300 receives the filtered alternating voltage from the resonant tank 1200 and induces a secondary alternating voltage across an output winding 1320 of the transformer 1300.

In this example, the output winding 1320 of the transformer 1300 has a center-tap 1321. This center-tap 1321 is used as a connection point for the rectifier 1400, which in this example has a push-pull topology. However, it will be apparent that in other examples the output winding 1320 need not comprise a center-tap 1321. For example, the rectifier 1400 could instead have a full-bridge topology and thus, for example, could be connected to either end of the output winding 1320.

As previously mentioned, the rectifier 1400 in this example has a push-pull rectifier topology. In this example, the rectifier 1400 uses active rectification, and includes a third switching element 1401 and a fourth switching element 1402. However, in other examples passive rectification may instead be used. For example, the switching elements 1401 and/or 1402 could be replaced with diodes in an equivalent passive rectifier. In this example, the (rectifying) switching elements 1401 and 1402 are operated so as to only allow current to flow in one direction, e.g. either into or out of the center-tap 1321, so as to rectify the secondary alternating voltage. The rectifier 1400 in this example also includes a smoothing capacitor 1403, which filters out AC components of the rectifier secondary voltage. Thus, a DC output voltage 1002 is provided to the load 1003.

The LLC voltage converter 1000 operates to convert the DC input voltage Vg into the DC output voltage Vout. During operation, the input voltage Vg may vary (e.g. decreasing as a battery providing the voltage is discharged). To maintain the output voltage Vout at a target level (e.g. 28 V), the switching frequency of the inverter is adjusted to compensate for any changes in the DC input voltage Vg. For example, if the input voltage Vg increases (which would, absent compensation, increase the output voltage Vout), the switching frequency may be increased to move compensate for the input voltage increase and keep the output voltage Vout at the target. Conversely, when the input voltage Vg drops, the controller controls the inverter 1100 to decrease the switching frequency to compensate.

However, it is undesirable for the switching frequency to deviate too significantly from the resonant frequency of the resonant tank 1200, as this can decrease efficiency. Therefore, the controller 1450 operates to change the turns ratio of the transformer 1300 as the LLC voltage converter 1000 operates, to allow the switching frequency to remain closer to the resonant frequency whilst still maintaining the DC output voltage 1002 as desired.

The transformer 1300 may be operated with a first turns ratio, a second turns ratio and, in this example, a third turns ratio. In this example, the input winding 1310 of the transformer 1300 has a first tap 1311 and a second tap 1312. The turns ratio of the transformer 1300 is selected by the switching arrangement 1500 under the control of the controller 1450.

The controller 1450 can cause the LLC voltage converter 1000 to operate in different modes in which the transformer 1300 has different turns ratios. In a first mode, the switching arrangement 1500 is controlled such that the input winding 1310 is connected at both ends such that the transformer has the first turns ratio. In a second mode, the input winding 1310 is connected at one end and the first tap 1311 such that the transformer has the second turns ratio. In a third mode, the input winding 1310 is connected at one end and the second tap 1312 such that the transformer has the third turns ratio. In other examples, it will be appreciated that the transformer may only have one tap, or may instead have more than two taps In this example, the transformer 1300 is a planar transformer. This may be particularly convenient, as it is straightforward to tap to planar transformer in several positions. In other examples, it is not essential for the transformer 1300 to be a planar transformer.

While in this example only the input winding 1310 is tapped, in other examples only the output winding 1320 may be tapped, e.g. at one or more positions between its ends. In some examples, both the input winding 1310 and the output winding 1320 may be tapped.

Figure 2:
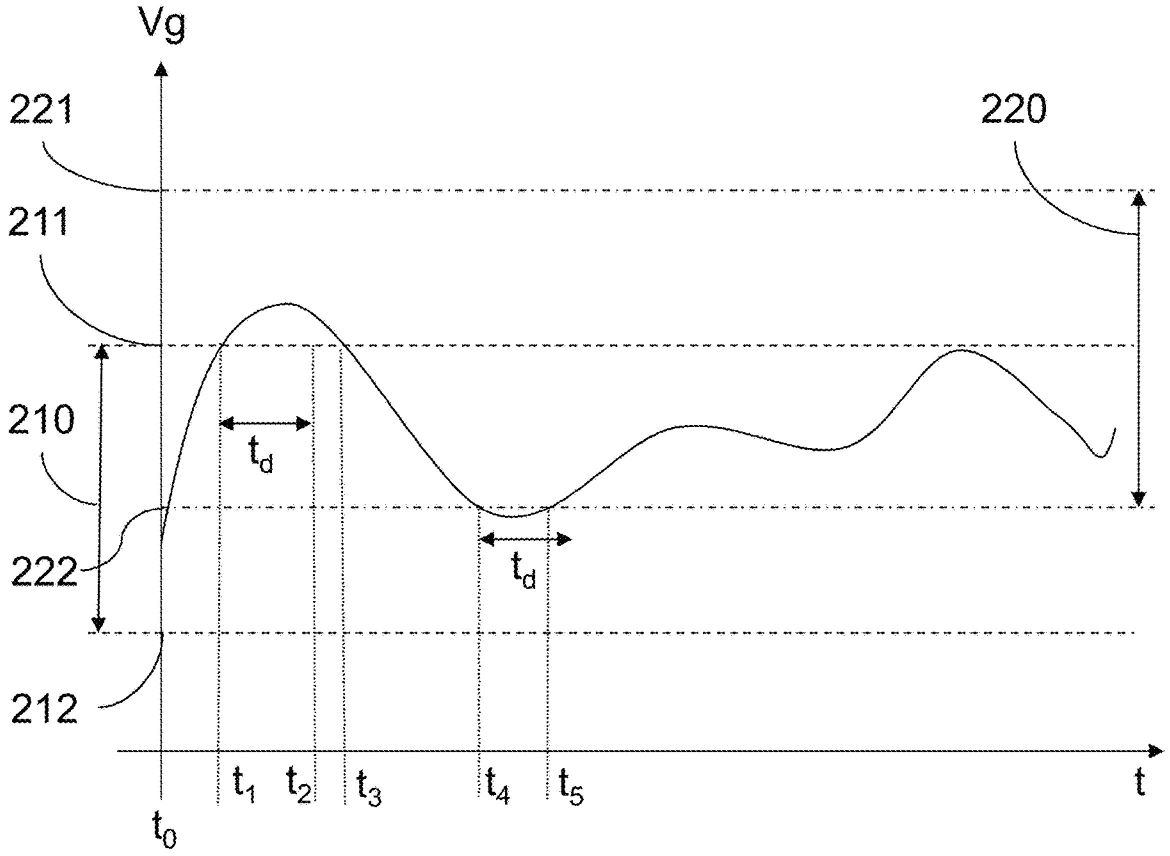
FIG. 2 shows a graph of the variation of an operational parameter for the LLC voltage converter shown in FIG. 1.

The operation of the LLC voltage converter 1000 will now be described in more detail with additional reference to FIG. 2. FIG. 2 shows how the input voltage Vg might vary over time as the LLC voltage converter 100 operates. FIG. 2 shows a first range 210 for input voltage which is associated with the first mode of operation. The graph also shows a second range 220 for the input voltage, which is associated with the second mode of operation (although as explained below the LLC voltage converter 1000 may not always operate in the first mode when the input voltage is in the first range 210 or in the second mode when the input voltage is in the second range 220).

The first range 210 has an upper threshold 211 and a lower threshold 212. The second range 220 has an upper threshold 221 and a lower threshold 222. The first range 210 and the second range 220 partially overlap.

At an initial time t0, the input voltage Vg is in a first range 210 and the LLC voltage converter 1000 is in the first mode of operation, in which all of the turns of the input winding 1310 are connected to receive the alternating voltage.

As the LLC voltage converter is used, the input voltage Vg steadily rises into a second range 220 (e.g. due a change in environmental conditions such as temperature). The switching frequency of the inverter 1100 is adjusted up as explained above to compensate for this rise and maintain the output voltage Vout at the target voltage.

At time t1, the input voltage Vg has moved out of the first range 210, but remains within the second range 220. After a short delay td, at t2, the controller 1450 causes the LLC voltage converter to transition from the first mode of operation to the second mode of operation by controlling the switching arrangement 1500 to connect the alternating voltage to the first tap 1311 and disconnect the connection to the end of the input winding 1310. The delay may mitigate unnecessary transitioning arising from brief fluctuations of the input voltage Vg. In this example, the delay $t_d$ arises because the controller only determines (e.g. by measurement) whether the input voltage Vg is within the first range and/or the second range (or outside of both ranges) at certain intervals in order to prevent unnecessary transitions between modes of operation.

It is possible to configure the LLC voltage converter 1000 such that it is necessary to determine that the input voltage Vg is outside the first range and within the second range two or more successive times (e.g. spaced apart by time intervals) for the controller 1450 to transition the LLC voltage converter 1000 from operating in the first mode to operate in the second mode. This may prevent unnecessary transitions between modes of operation (e.g. in addition to the intervals between determination of whether the input voltage Vg is within the first and/or second range).

When transitioning between the first mode and the second mode, the switching arrangement is arranged to connect its input to the first tap 1311 before disconnecting its input from the end of the input winding 1310. This make-before-break operation may advantageously reduce losses when transitioning between the first mode and the second mode and/or transition between modes more smoothly so as to avoid large voltage swings at the output.

As the input winding 1310 of the transformer has fewer turns in the second mode of operation, a desired output voltage may be achieved with a lower switching frequency than is necessary to achieve the same desired voltage in the first mode. Thus, transitioning into the second mode mitigates the need for the switching frequency to move significantly away from the resonant frequency even when the input voltage Vg increases relatively substantially.

At time $t_3$, the operational parameter re-enters the first range 210. However, as the first range 210 and the second range 220 partially overlap, no transitioning from the second mode to the first mode occurs at time $t_3$ as the control parameter is still within the second range 220.

At time $t_4$, the control parameter moves below the second range 220. However, the control parameter does not remain outside of the second range 220 for at least the minimum duration td, and instead moves back within the second range 220 at time $t_5$ before the end of this minimum duration td. Therefore, the LLC voltage converter 1000 does not transition from the second mode of operation to the first mode to avoid excessive transitioning.

In this example, transitioning from the second mode of operation to the third mode of operation is controlled in the same manner as transitioning from the first mode to the second mode. Similarly, the same principles are used to transition from the third mode to the second mode, and from the second mode to the first mode.

Figure 3:
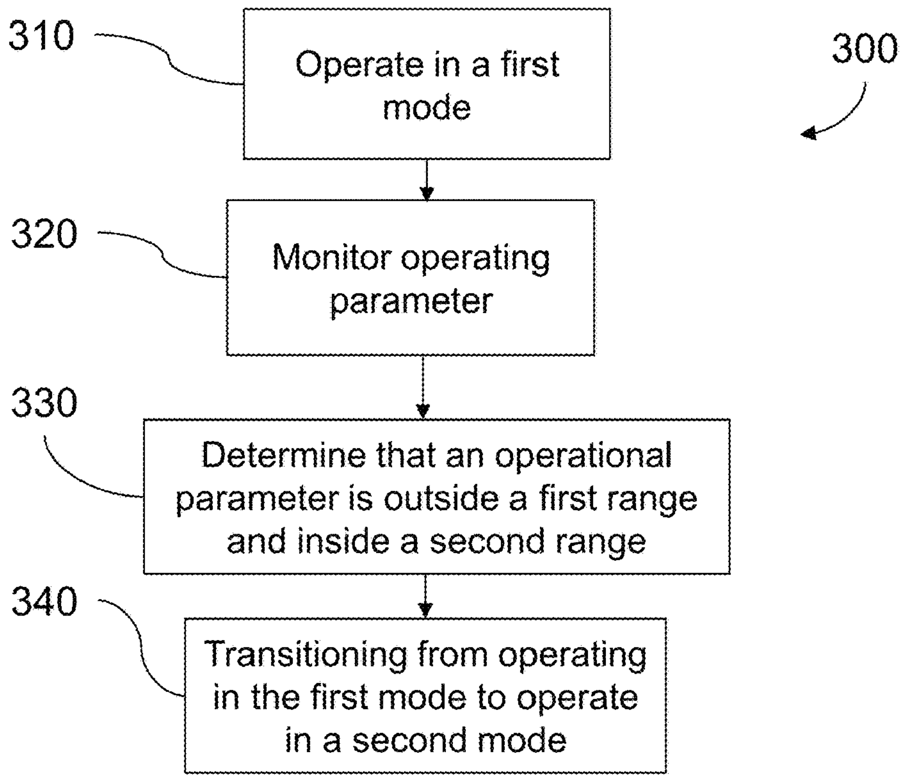
FIG. 3 shows a flow diagram outlining the steps of a method of operating the LLC voltage converter shown in FIG. 1.

FIG. 3 shows a flow diagram outlining the steps of a method 300 of operating the LLC voltage converter shown in FIG. 1.

The first step 310 of the method 300 is to operate the LLC voltage converter 1000 in a first mode wherein the transformer 1300 has a first turns ratio. It will be apparent that the LLC voltage converter 1000 is operated in the first mode at this point because an operational parameter (e.g. the input voltage Vg) is inside a first range (e.g. the range 210 shown in FIG. 2) associated with the first mode. In this example, the first mode corresponds to the input winding 1310 of the transformer 1300 being connected at both ends.

The method also includes the second step 320 of monitoring the operational parameter, such that it is possible to determine that the value of the operational parameter has changed to be outside the first range and inside the second range.

A third step of the method 330 includes determining that the value of the operational parameter (e.g. the input voltage Vg) has changed to be outside the first range (e.g. the range 210 shown in FIG. 2) and inside a second range (e.g. the range 220 shown in FIG. 2). The first range and the second range at least partially overlap.

A fourth step of the method 340 includes transitioning the LLC voltage converter 1000 from operating in the first mode to operate in a second mode, wherein the transformer 1300 has a second turns ratio.

In this example, this includes operating the switching arrangement 1500 to form a circuit using the first tap 1311 of the input winding 1310 of the transformer 1300. Once this circuit is formed, the switching arrangement 1500 breaks the connection to the end of the input winding 1310 of the transformer 1300. In other examples, transitioning from a first mode to a second mode could include, for example, connecting to another input winding (e.g. in addition to or instead of the input winding 1310), connecting to another output winding (e.g. in addition to or instead of the output winding 1320) or connecting to a tap of the output winding 1320 (e.g. in a similar manner to connecting to the first tap 1311 of the input winding 1310).

In certain examples, transitioning from operating in the first mode to operating in the second mode requires that the operational parameter be outside the first range and inside the second range for at least a minimum period of time (e.g. the time taken to obtain two or more measurements of the input voltage Vg) to prevent unnecessary switching of the switching arrangement 1500.

Once in the second mode, the method 300 may repeat to monitor for further changes to the operating parameter which may necessitate further transitions (e.g. from the second mode back to the first mode into another mode). The method 300 may include a step of waiting (e.g. before continuing to monitor the operational parameter and/or before transitioning to another mode). Introducing a wait time may reduce unnecessary switching of the switching arrangement 1500 if the operational parameter fluctuates around transition points.

Figure 4:
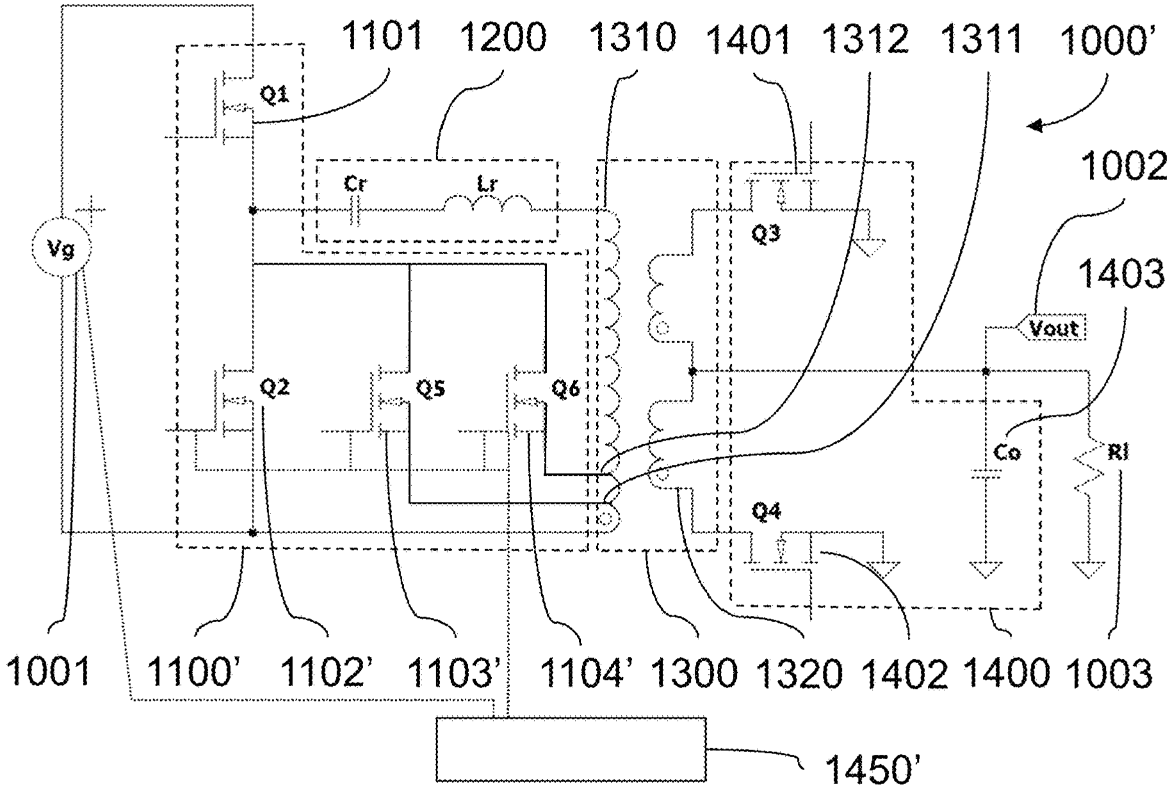
FIG. 4 shows a variation of the LLC voltage converter shown in FIG. 1 which has an inverter which is operable to change a turns ratio of the transformer.

FIG. 4 shows another example of an LLC voltage converter 1000'. As will be apparent, the LLC voltage converter 1000 is similar in many respects to the LLC voltage converter 1000 shown in FIG. 1. For instance, the input voltage Vg, the resonant tank 1200, the transformer 1300, the rectifier 1400, the output voltage Vout 1002, and the output load 1003 are similar to their counterparts in FIG. 1 and thus will not be described in detail. However, in this example, the turns ratio of the transformer is changed by power switching elements 1102', 1103', 1104' of the inverter 1100' rather than by a distinct switching arrangement.

The inverter 1100' has a first power switching element 1101 and a second power switching element 1102'. The inverter 1100' also includes a third power switching element 1103' and a fourth power switching element 1104' arranged in parallel with the second power switching element 1102'.

The second power switching element 1102' is connected to an end of the input winding 1310 of the transformer 1300. The third power switching element 1103' is connected to the first tap 1311 of the input winding 1310 of the transformer 1300. The fourth power switching element 1104' is connected to the second tap 1312 of the input winding 1310 of the transformer 1300.

Thus, rather than using a switching arrangement such as the switching arrangement 1500 shown in FIG. 1, the controller transitions the LLC voltage converter 1000' between modes of operation by changing which of the second 1102', third 1103' and fourth 1104' switching elements are used by the inverter. It will be apparent that such an approach may be used in combination with a switching arrangement before and/or after the switching elements. For example, the LLC voltage converter 1000' could include a switching arrangement before the switching elements 1102', 1103', 1104' to connect to any of the second 1102', third 1103' or fourth 1104' switching elements. Alternatively or in addition, the LLC voltage converter 1000' could include a switching arrangement after one or more of the switching elements 1102', 1103', 1104' to selectively connect them to any of one or more taps or ends of the input winding 1310.

It will be appreciated that the rectifier 1400 could have a rectifying switching element connected to one or more taps (e.g. via a switching arrangement) in parallel with the first rectifying switching element 1401 and/or the second switching element 1402 in a corresponding manner.

Figure 5:
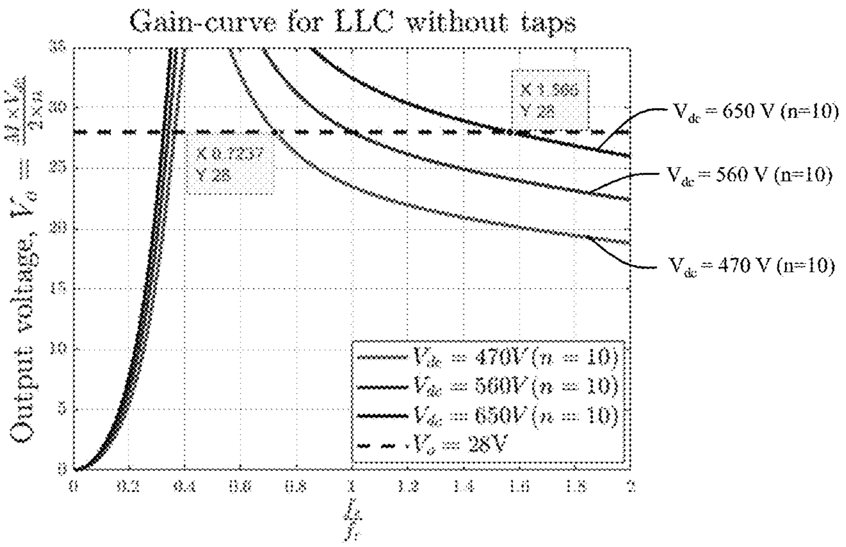
FIG. 5 shows the relationship between the gain and switching frequency of an LLC voltage converter, that does not have a transformer with a configurable turns ratio, as the input voltage is varied.

FIG. 5 shows the relationship between the gain and switching frequency of an LLC voltage converter, that does not have a transformer with a configurable turns ratio, as the input voltage is varied. It can be seen that with an input voltage of 560 volts, the output voltage is 28 volts when the switching frequency is equal to the resonant frequency. However, for an input voltage of 470 volts, the switching frequency must be decreased to approx. 70% of the resonant frequency to achieve an output of 28 volts. For an input voltage of 650 volts, a switching frequency approx. 60% greater than the resonant frequency is required to achieve an output voltage of 28 volts. For the previously mentioned reasons, increasing the difference between the switching frequency and the resonant frequency may result in a reduction of the LLC voltage converter's efficiency.

Figure 6:
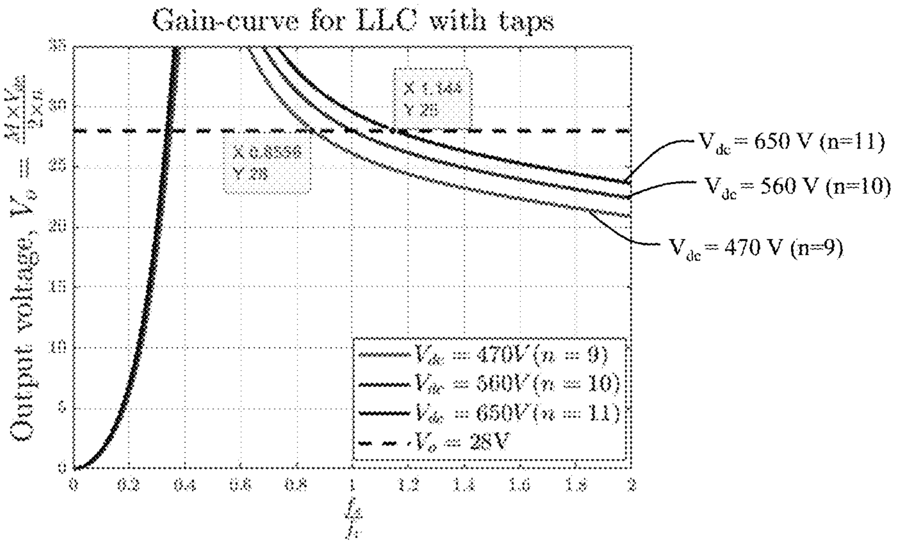
FIG. 6 shows the relationship between the gain and switching frequency of an LLC voltage converter, that has a transformer with a configurable turns ratio, as the input voltage is varied.

FIG. 6 shows the relationship between the gain and switching frequency of an LLC voltage converter according to an example of the present disclosure, that has a transformer with a configurable turns ratio, as the input voltage is varied. The voltage converter is also arranged to provide an output voltage of 28 volts. By changing the turns ratio of the transformer, it is possible to reduce the difference between the switching frequency and the resonant frequency when the input voltage is varied. For instance, the switching frequency in this example is approx. 80% of the resonant frequency for an input voltage of 470 volts and approx. 20% greater than the resonant frequency for an input voltage of 650 volts. Thus, it can be seen that by changing the transformer turns ratio, it is possible for the switching frequency to be closer to the resonant frequency than in the example shown in FIG. 5.

FIGS. 7 and 8 show tables including corresponding experimental data for the graphs shown in FIGS. 5 and 6. FIG. 7 corresponds to FIG. 5 and FIG. 8 corresponds to FIG. 6.

The first column of each table shows the input voltage. The second column of each table shows the switching frequency. The third column of each table shows the transformer turns ratio. The fourth column of each table shows the output voltage. The fifth column of each table shows the input power. The sixth column of each table shows the output power. The seventh column of each table shows the efficiency of the LLC voltage converters.

As can be seen, an efficiency improvement can be achieved by changing the transformer turns ratio when the input voltage is varied.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. An LLC voltage converter for converting a DC input voltage to a DC output voltage, the LLC voltage converter comprising:
- an inverter configured to receive the DC input voltage and provide an alternating voltage that alternates at a switching frequency;
- a resonant tank having a resonant frequency and configured to filter the alternating voltage from the inverter;
- a transformer configured to receive the filtered alternating voltage from the resonant tank and induce a secondary alternating voltage;
- a rectifier configured to receive and rectify the secondary alternating voltage to provide the DC output voltage; and
- a controller configured to:
  - monitor an operational parameter of the LLC voltage converter;
  - operate the LLC voltage converter in a first mode in which the transformer has a first turns ratio when a value of the operational parameter is within a first range;
  - determine that the value of the operational parameter has changed to be outside the first range and inside a second range, wherein the first range and the second range at least partially overlap; and
  - in response to determining that the value of the operational parameter has changed to be outside the first range and inside the second range, transition the LLC voltage converter from operating in the first mode to operate in a second mode in which the transformer has a second turns ratio.

2. The LLC voltage converter as claimed in claim 1, wherein the operational parameter comprises one or more of:
- the DC input voltage; or
- the switching frequency of the alternating voltage.

3. The LLC voltage converter as claimed in claim 1, wherein the controller is configured to only transition the LLC voltage converter from the first mode to the second mode in response to determining that the operational parameter has changed to be outside the first range and inside the second range for at least a minimum duration.

4. The LLC voltage converter as claimed in claim 1, wherein the first range, the second range, the first turns ratio, and the second turns ratio are such that transitioning from the first mode to the second mode causes the switching frequency to become closer to the resonant frequency.

5. The LLC voltage converter as claimed in claim 1, wherein the LLC voltage converter is configured to use different sections of an input winding and/or different sections of an output winding to obtain different turns ratios.

6. The LLC voltage converter as claimed in claim 5, wherein the input winding and/or the output winding comprises a tap.

7. The LLC voltage converter as claimed in claim 1, wherein the LLC voltage converter is configured to step-up the DC input voltage into a higher DC output voltage in the first mode and to change the turns ratio of the transformer from the first turns ratio to the second turns ratio by changing a number of turns of an input winding.

8. The LLC voltage converter as claimed in claim 7, wherein the LLC voltage converter is configured to change the turns ratio of the transformer from the first turns ratio to the second turns ratio by changing only the number of turns of the input winding.

9. The LLC voltage converter as claimed in claim 1, wherein the LLC voltage converter is configured to change the turns ratio of the transformer by one of:
- changing only a number of turns of an input winding whilst keeping an output winding the same;
- changing only a number of turns of the output winding whilst keeping the input winding the same; or
- changing the numbers of turns of both the input and output windings.

10. The LLC voltage converter as claimed in claim 1, wherein the controller is configured to transition the LLC voltage converter from operating in the first mode to operating in the second mode by forming a circuit which causes the transformer to have the second turns ratio before breaking a circuit which causes the transformer to have the first turns ratio.

11. The LLC voltage converter as claimed in claim 1, further comprising a switching arrangement configured to transition the transformer's turns ratio from the first turns ratio to the second turns ratio.

12. The LLC voltage converter as claimed in claim 1, wherein the inverter comprises:
- a first set of power switching elements configured to provide the alternating voltage to a first input winding or a first section of an input winding of the transformer; and
- a second set of power switching elements configured to provide the alternating voltage to a second input winding or a second portion of the input winding of the transformer; and
- wherein the inverter is configured to change the turns ratio of the transformer by using the first set of power switching elements when in the first mode and using the second set of power switching elements when in the second mode.

13. The LLC voltage converter as claimed in claim 1, wherein the controller is configured to:
- operate the LLC voltage converter in the second mode when the value of the operational parameter is within the second range;
- determine that the value of the operational parameter has changed to be outside the second range and inside the first range; and
- in response to determining that the value of the operational parameter has changed to be outside the second range and inside the first range, transition the LLC voltage converter from operating in the second mode to operating in the first mode.

14. The LLC voltage converter as claimed in claim 1, wherein the controller is configured to:
- determine that the value of the operational parameter has changed to be outside the first range and the second range and inside a third range, wherein the third range at least partially overlaps the first range or the second range; and
- in response to determining that the value of the operational parameter has changed to be outside the first range and the second range and inside the third range, transition the LLC voltage converter to operate in a third mode in which the transformer has a third turns ratio.

15. A method of controlling an LLC voltage converter to convert a DC input voltage to a DC output voltage, the LLC voltage converter comprising an inverter configured to receive the DC input voltage and provide an alternating voltage that alternates at a switching frequency, a resonant tank having a resonant frequency configured to filter the alternating voltage from the inverter, and a transformer configured to receive the filtered alternating voltage from the resonant tank and to induce a secondary alternating voltage, wherein the method comprises:

monitoring an operational parameter of the LLC voltage converter;

operating the LLC voltage converter in a first mode in which the transformer has a first turns ratio when a value of the operational parameter is within a first range;

determining that the value of the operational parameter has changed to be outside the first range and inside a second range, wherein the first range and the second range at least partially overlap; and in response to determining that the value of the operational parameter has changed to be outside the first range and inside the second range, transitioning the LLC voltage converter from operating in the first mode to operating in a second mode in which the transformer has a second turns ratio.

16. The method as claimed in claim 15, wherein the LLC voltage converter transitions from the first mode to the second mode in response to determining that the operational parameter has changed to be outside the first range and inside the second range for at least a minimum duration.

17. The method as claimed in claim 15, wherein the LLC voltage converter steps-up the DC input voltage into a higher DC output voltage in the first mode and changes the turns ratio of the transformer from the first turns ratio to the second turns ratio by changing a number of turns of an input winding.

18. The method as claimed in claim 15, wherein the LLC voltage converter transitions from operating in the first mode to operating in the second mode by forming a circuit which causes the transformer to have the second turns ratio before breaking a circuit which causes the transformer to have the first turns ratio.

19. The method as claimed in claim 15, wherein the inverter comprises:

a first set of power switching elements configured to provide the alternating voltage to a first input winding or a first section of an input winding of the transformer; and a second set of power switching elements configured to provide the alternating voltage to a second input winding or a second portion of the input winding of the transformer; and wherein the inverter changes the turns ratio of the transformer by using the first set of power switching elements when in the first mode and using the second set of power switching elements when in the second mode.

20. The method as claimed in claim 15, further comprising:

determining that the value of the operational parameter has changed to be outside the first range and the second range and inside a third range, wherein the third range at least partially overlaps the first range or the second range; and in response to determining that the value of the operational parameter has changed to be outside the first range and the second range and inside the third range, transitioning the LLC voltage converter to operate in a third mode in which the transformer has a third turns ratio.

* * * * *